United States Patent [19]

Matsuura et al.

[11] Patent Number: 4,617,284

[45] Date of Patent: Oct. 14, 1986

[54] CATALYST COMPONENT FOR POLYMERIZATION OF OLEFINS AND PROCESS FOR PRODUCTION THEREOF

[75] Inventors: Mitsuyuki Matsuura, Kameyama; Takashi Fujita, Yokkaichi; Yoshio Sakamoto, Suzuka, all of Japan

[73] Assignee: Mitsubishi Petrochemical Company, Limited, Tokyo, Japan

[21] Appl. No.: 738,190

[22] Filed: May 28, 1985

[30] Foreign Application Priority Data

Jun. 4, 1984 [JP] Japan ................................ 59-114184
Jul. 12, 1984 [JP] Japan ................................ 59-143306

[51] Int. Cl.$^4$ ............................................. C08F 4/64
[52] U.S. Cl. ...................................... 502/111; 502/104; 502/105; 502/113; 502/123; 502/124; 502/125; 502/126; 502/127; 526/125
[58] Field of Search ............... 502/104, 105, 111, 113, 502/123, 124, 125, 126, 127

[56] References Cited

U.S. PATENT DOCUMENTS 4,308,170 12/1981 Mizogami et al. ............. 502/125 X
4,506,029 3/1985 Band ................................... 502/111

*Primary Examiner*—Patrick P. Garvin
*Attorney, Agent, or Firm*—Oblon, Fisher, Spivak, McClelland & Maier

[57] ABSTRACT

A catalyst component for polymerization of olefins, which consists essentially of a particulate contact reaction product of an average particle size of 10 to 100 microns, obtained by contacting the surfaces of particles of a product of contact reaction with a magnesium halide and an alkoxy group-containing compound of a metal of Group I, II, III or IV of the Periodic Table with an alcohol compound and contacting the resulting contact reaction product with a liquid titanium halide. This catalyst component has a high activity and provides a polymer having a relatively large particle size and a narrow particle size distribution.

18 Claims, No Drawings

4,617,284

CATALYST COMPONENT FOR POLYMERIZATION OF OLEFINS AND PROCESS FOR PRODUCTION THEREOF

BACKGROUND OF THE INVENTION

1. Field of the Invention

The present invention relates to a transition metal component of a so-called Ziegler catalyst. According to the present invention, there is provided a catalyst component having a high activity and being capable of producing a polymer having a relatively large particle size. The invention relates also to a process for producing the catalyst component.

2. Description of the Prior Art

It is known that a high-activity catalyst is obtained when a magnesium compound, for example, a magnesium halide, a magnesium alkoxide, hydroxy-magnesium chloride or a dialkyl magnesium, is used as the carrier component.

In the case where an olefin is polymerized by using a Ziegler type catalyst comprising this carrier catalyst component (solid catalyst component), the olefin polymer is obtained in a particulate form, but the particle size and particle size distribution of the olefin polymer thus obtained depend on the state of the particles of the solid catalyst component used. In order to increase the polymer concentration in the formed polymer slurry and improve the productivity by facilitating handling of the polymer slurry, it is preferred that the formed polymer particles have a relatively large diameter and a uniform particle size.

In the above mentioned high-activity catalyst, however, it is difficult to control the particle size of the catalyst component, and in many cases, the average particle size is about 5 to about 10 microns and the particle size distribution is broad. Accordingly, the conventional high-activity catalyst is still inadequate.

Therefore, development of a process for preparing a catalyst having an average particle size of at least 10 microns, in which the particle size distribution can be controlled, is eagerly desired in the art.

U.S. Pat. Nos. 3,953,414 and 4,311,817 and Japanese Patent Application Laid-Open Specifications Nos. 55-2951, 55-135102, 55-135103 and 56-67311 may be cited as prior art references.

According to these conventional techniques, a magnesium compound as the carrier component is finely divided or fused, and then, spray-drying granulation or rapid cooling solidification is carried out. In these methods, large equipment investment is necessary for increasing the catalyst particle size, so far as we known, and it is considered that the distribution of the catalyst particles is still broad.

SUMMARY OF THE INVENTION

It is a primary object of the present invention to overcome the foregoing shortcomings of the conventional techniques by using a carrier transition metal catalyst component prepared in a specific manner.

More specifically, in accordance with the present invention, there is provided a catalyst component for polymerization of olefins, which is formed by contacting the surfaces of particles of a product of contact reaction between a halide of magnesium and an alkoxy group-containing compound of a metal selected from metals of Groups I through IV of the Periodic Table with an organic hydroxy compound, as described subsequently, compound and then with a liquid halide of titanium, the average particle size of this catalyst component being within a range of 10 to 100 microns.

When polymerization of an olefin is carried out by using this solid catalyst component as the transition metal catalyst component of a Ziegler catalyst, the polymerization activity is high, and a polymer having a relatively large particle size and a controlled particle size distribution can be obtained.

The reason why a polymer having a controlled particle size can be obtained with a high activity if the catalyst component of the present invention is used has not been completely elucidated, but it is believed that in order to obtain this excellent effect, it is important that the particle surfaces of the product of contact reaction between a halide of magnesium and an alkoxy group-containing compound of a metal selected from metals of Groups I through IV of the Periodic Table be reacted with an alcohol.

DETAILED DESCRIPTION OF THE INVENTION

Catalyst Component for Polymerization of Olefins and Composition Thereof

The catalyst component for polymerization of olefins according to the present invention consists essentially of a contact reaction product of the following components.

(A) Halide of Magnesium

In the present invention, as the magnesium halide, compounds represented by the general formula $MgX_2$ in which X stands for a halogen atom can be used. Furthermore, use may be made also 0f compounds of the above general formula in which one X is substituted by another group, for example, —OR in which R stands for an alkyl group having 1 to 10 carbon atoms, preferably 1 to 5 carbon atoms, —OH, —(SO)$_{\frac{1}{2}}$ or —(CO$_3$)$_{\frac{1}{2}}$. Specific examples are $MgF_2$, $MgCl_2$, $MgBr_2$, $MgI_2$, $Mg(OC_2H_5)Cl$, $Mf(OC_6H_5)Cl$, $Mg(OCH_3)Cl$ and $Mg(OH)Cl$.

(B) Alkoxy Group-Containing Compound of Metal of Group I, II, III or IV of Periodic Table As the alkoxy group-containing compound of a metal of Group I, II, III or IV of the Periodic Table, compounds represented by the general formula $M—(OR)_n$ in which M stands for a metal of Group I, II, III or IV of the Periodic Table, R stands for an alkyl, aryl or cycloalkyl group having 1 to 10 carbon atoms, preferably 1 to 6 carbon atoms, and n stands for the valency of M can be used. Furthermore, compounds of the above general formula in which a part of groups —(OR) is substituted by another atom or element, preferably an oxygen or halogen atom or a hydrocarbon residue, can be used.

Specific examples are $Li(OC_2H_5)$, $Na(OC_2H_5)$, $Ca(OC_2H_5)_2$, $Zn(OC_2H_5)_2$, $Mg(OC_2H_5)_2$, $Mg(O—i—C_3H_7)_2$, $B(OC_2H_5)_3$, $Al(OC_2H_5)_3$, $Al(O—i—C_3H_7)_3$, $Si(OC_2H_5)_4$, $Si(O—n—C_4H_9)_4$, $Ti(OC_2H_5)_4$, $Ti(O—i—C_3H_7)_4$, $Ti(O—n—C_4H_9)_4$, $Ti(OC_6H_5)_4$, $Zr(OC_2H_5)_4$, $Sn(OC_2H_5)_4$, $Mg(OC_2H_5)Cl$, $Si(OC_2H_5)_3Cl$, $Si(OC_2H_5)_2Cl_2$, $Al(OC_2H_5)_2Cl$, $Ti(OC_4H_9)_3Cl$, $Ti(OC_2H_5)_2Cl_2$, $VO(O—n—C_4H_9)_3$, $Ti(O—i—C_3H_7)_2Br_2$, $(CH_3)_2Si(OCH_3)_2$, $(CH_3)Si(OCH_3)_3$, $(CH_3)Si(OC_2H_5)_3$ and $(C_2H_5)_2Si(OC_2H_5)_2$.

Among these alkoxy group-containing metal compounds, alkoxy group-containing compounds of titanium and silicon are preferred, and tetraalkoxysilanes are especially preferred.

(C) Organic Hydroxy Compound Compound

One type of the organic hydroxy compound which is suitable for use in the present invention is an alkanol. Monohydric and polyhydric alcohols having 1 to 20 carbon atoms, preferably 1 to 10 carbon atoms, are generally suitable. Specific examples are methanol, ethanol, isopropanol, n-propanol, isobutanol, n-butanol, hexanol, n-octanol, 2-ethylhexanol, ethylene glycol, ethylene glycol monomethyl ether, ethylene glycol monoacetate and glycerol.

Another type of the organic hydroxy compound which can be used in the present invention is a silanol. Ordinarily, silanols having 1 to 20 carbon atoms are suitable for use. Trimethylsilanol, dimethylsilane-diol, diphenyldilane-diol and phenylsilane-triol are examples.

Still another type of the organic hydroxy compound which can be used in the present invention is a phenol compound. Examples are phenol, o-cresol and p-cresol.

(D) Liquid Halogen Compound of Titanium

By the term "liquid" is meant not only a compound which is liquid (inclusive of a compound which is liquid in the form of a complex) but also a compound which is liquid in the form of a solution.

As a typical example, mention can be made of a titanium halide or halogen-containing titanium alcoholate represented by the general formula $Ti(OR^1)_{4-n}X_n$ in which: $R^1$ stands for a hydrocarbon residue, preferably a hydrocarbon residue having 1 to 10 carbon atoms; X stands for a halogen atom; and n is a number in the range of $0 < n \leq 4$.

Specific examples are $TiCl_4$, $TiBr_4$, $Ti(OC_2H_5)Cl_3$, $Ti(OC_2H_5)_2Cl_2$, $Ti(OC_2H_5)_3Cl$, $Ti(O-i-C_3H_7)Cl_3$, $Ti(O-n-C_4H_9)Cl_3$, $Ti(O-n-C_4H_9)_2Cl_2$, $Ti(OC_2H_5)Br_3$, $Ti(OC_2H_5)(OC_4H_9)Cl_2$, $Ti(O-n-C_4H_9)_3Cl$, $Ti(O-C_6H_5)Cl_3$, $Ti(OC_5H_{11})Cl_3$ and $Ti(OC_6H_{13})Cl_3$.

Moreover, a molecular compound obtained by reacting the above mentioned titanium halide compound with an electron donor may be used as the liquid titanium halide compound. For example, $TiCl_4 \cdot CH_3COC_2H_5$, $TiCl_4 \cdot CH_3CO_2C_2H_5$, $TiCl_4 \cdot C_6H_5NO_2$, $TiCl_4 \cdot CH_3COCl$, $TiCl_4 \cdot C_6H_5COCl$, and $TiCl_4 \cdot C_6H_5CO_2C_2H_5$ may be used.

(E) Polymeric Silicon Compound

A polymeric silicon compound (E) described below can be used in combination with the above mentioned liquid titanium halide compound.

That is, a polymeric silicon compound having a structure of

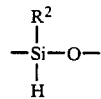

in which $R^2$ stands for a hydrocarbon residue having 1 to 10 carbon atoms can be used. Specific examples are methylhydropolysiloxane, ethylhydropolysiloxane, phenylhydropolysiloxane and cyclohexylpolysiloxane. The degree of polymerization of the polymeric silicon compound is not particularly critical. In view of the handling property, however, it is preferable that the polymeric silicon compound have a molecular weight corresponding to 10 to 100 cSt. The terminal structure of the hydropolysiloxane has no substantial influence on the catalyst component of the present invention, but it is ordinarily desirable that the terminal structure be blocked by an inert group such as a trialkylsilyl group. Among the foregoing polymeric silicon compounds, alkylhydrosiloxanes, especially methylhydrosiloxane, are preferred.

(F) Inorganic Metal Halide

In order to increase the particle size of the catalyst component, it is preferable that an inorganic metal halide (F) be added in preparing a contact reaction product from the magnesium halide (A) and the alkoxy group-containing compound (B) of a metal of Group I, II, III or IV of the Periodic Table. Any of compounds known as inorganic metal halides can be used. Typical examples are LiCl, NaCl, KCl, NaBr, BeCl, $CaCl_2$, $SrCl_2$, $BaCl_2$, $ZrCl_4$, $MoCl_3$, $MoCl_5$, $CrCl_3$, $MnCl_2$, $FeCl_2$, $FeCl_3$, $FeBr_2$, $FeBr_3$, $CoCl_2$, $NiCl_2$, $NiBr_2$, $CuCl_2$, $CuCl$, $CuBr_2$, $ZnCl_2$, $AlCl_3$, $AlBr_3$, $AlI_3$, $BCl_3$, $BBr_3$, $GeCl_2$, $GeCl_4$, $SiCl_4$, $SnCl_4$, $PtCl_2$, $PtCl_4$, $InCl_3$, $WCl_6$, $TiCl_3$, and $TiCl_4$.

Among these inorganic metal halides, halides of metals of Groups III and IV of the Periodic Table, especially halides of aluminum, zirconium and titanium, are preferred. Chlorine, bromine and iodine are suitable as the halogen.

(G) Electron Donor

When the catalyst component of the present invention is used for polymerization of α-olefins having at least 3 carbon atoms, it is preferable, in order to improve the stereoregularity, that the catalyst component be treated with an electron donor (G) before or after the treatment of the component (D).

As the electron donor, oxygen-containing electron donors such as ketones, aldehydes, carboxylic acids, esters of organic and inorganic acids, ethers, acid amides and acid anhydrides, and nitrogen-containing electron donors such as ammonia, amines, nitriles, and isocyanates can be used. More specific examples are (a) ketones having 3 to 15 carbon atoms, such as acetone, methylethyl ketone, methylisobutyl ketone, acetophenone and benzophenone, (b) aldehydes having 2 to 15 carbon atoms, such as acetaldehyde, propionaldehyde, octylaldehyde, benzaldehyde, tolualdehyde and naphthaldehyde, (c) esters of organic acids having 2 to 20 carbon atoms, such as methyl formate, methyl acetate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, ethyl cyclohexane-carboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, cumarine, phthalide and ethylene carbonate, (d) inorganic acid esters such as silicic acid esters, for example, ethyl silicate, butyl silicate and phenyltriethoxysilane, (e) acid halides having 2 to 15 carbon atoms, such as acetyl chloride, benzoyl chloride, toluoyl chloride and anisoyl chloride, (f) ethers having 2 to 20 carbon atoms, such as methylether, ethylether, isopropylether, butylether, amylether, tetrahydrofuran, anisole and diphenylether, (g) acid amides such as acetic amide, benzoic amide and toluic amide, (h) amines such as methylamines, ethylamines, diethylamine, tributylamine, piperidine, tribenzylamine, aniline, pyridine, picoline and tetramethylethylenediamine, and (i) nitriles such as acetonitrile, benzonitrile, and tolunitrile. These electron donors can be used in the form of a mixture of two or more thereof.

Preparation of Catalyst Component

The catalyst component of the present invention is prepared by contacting the foregoing components in a specific order or according to a specific operational mode.

Ratios

The amounts used of the respective components are optional as long as the intended effects of the present invention are attained, but the following ranges are generally preferred.

The molar ratio of the alkoxide compound (B) of a metal of Group I, II, III or IV of the Periodic Table to the magnesium halide (A) is in the range of from $1 \times 10^{-3}$ to 50, preferably from 0.1 to 10.

The molar ratio of the organic hydroxy compound (C) to the magnesium halide (A) is in the range of from $1 \times 10^{-4}$ to 1, preferably from 0.1 to 0.8.

The molar ratio of the liquid titanium halide compound (D) to the magnesium halide (A) is in the range of from $1 \times 10^{-3}$ to 50, and when the polymeric silicon compound is used in combination with the titanium halide compound (D), it is preferable that the molar ratio of the titanium halide compound (D) to the magnesium halide (A) be in the range of from $5 \times 10^{-2}$ to $4 \times 10^{-1}$. The molar ratio of the polymeric silicon compound to the magnesium halide is in the range of from $1 \times 10^{-3}$ to 50, especially from 0.1 to 5.

The molar ratio of the inorganic metal halide (F) to the magnesium halide (A) is in the range of from 0 to 1.0, preferably from $1 \times 10^{-4}$ to 1.0, especially preferably from $1 \times 10^{-3}$ to $1 \times 10^{-1}$.

The molar ratio of the electron donor (G) to the magnesium halide (A) is in the range of from $1 \times 10^{-3}$ to 2, preferably from 0.05 to 1.0.

Contacting of Respective Components

Contacting of the respective components is carried out in any manner, as long as contacting of the alcohol compound (C) is carried out in a specific manner as described below, and the effects of the present invention are attained. The contacting temperature is ordinarily in the range of $-50°$ to $200°$ C.

Contacting of the magnesium halide (A) with the alkoxide compound (B) of a metal of Group I, II, III or IV of the Periodic Table is accomplished by contacting the surfaces of particles of the magnesium halide with the alkoxide compound. More specifically, particles of the magnesium halide are stirred with a liquid alkoxide compound or a solution of the alkoxide compound. Contacting between the two components is made more complete by mechanical pulverization, using a ball mill or shaking mill.

When the inorganic metal halide (F) is used, the surfaces of particles of the magnesium halide (A) are contacted with the alkoxide compound (B) of a metal of Group I, II, III or IV of the Periodic Table and the inorganic metal halide (F) simultaneously or stepwise. More specifically, particles of the magnesium halide are stirred with liquid compounds (B) and (F) (which may be in the form of a solution) or a fine dispersion of the compounds (B) and (F) in an organic solvent. Mechanical pulverization using a ball mill or shaking mill can be performed. The particles produced, with or without the use of (F), are termed primary particles.

As the dispersion medium, hydrocarbons, halogenated hydrocarbons, and dialkylpolysiloxanes can be used. More specifically, use can be made of hydrocarbons such as hexane, heptane, toluene and cyclohexane, halogenated hydrocarbons such as n-butyl chloride, 1,2-dichloroethylene, carbon tetrachloride and chlorobenzene, and dialkylpolysiloxanes such as dimethylpolysiloxane and methylphenylpolysiloxane.

Contacting of the product of contact reaction between the magnesium halide (A) and the alkoxy group-containing compound (B) of a metal of Group I, II, III or IV of the Periodic Table with the organic hydroxy compound (C) is carried out so that only the surface portion of the product of contact reaction between the magnesium halide (A) and the alkoxide compound (B) is contacted with the organic hydroxy compound compound (C). Accordingly, the method of immersing the (A)/(B) contact reaction product in a bath of the organic hydroxy compound compound (C) is not preferred, except in the case where the immersion time is so short that the organic hydroxy compound compound (C) does not permeate into the interior of the particles.

A preferred method comprises spraying droplets of the organic hydroxy compound of a size of 10 to 1,000 microns to particles of the product of contact reaction between the magnesium halide and the alkoxide compound or a suspension of the particles with stirring to contact the surfaces of the particles with the organic hydroxy compound. In this method, it is preferable that the amount of the organic hydroxy compound be such that the surfaces of the particles of the product of contact reaction between the magnesium halide and the alkoxide compound are wetted with the organic hydroxy compound, and the state of immersion of the particles in the excessive amount of the organic hydroxy compound be avoided. A relatively short contact time is preferred, a contact time of about 1 second to about 5 minutes being sufficient.

If the organic hydroxy compound compound (C) is uniformly added in the form of fine droplets under the above mentioned conditions, reaction proceeds promptly upon contact of the particles of the product of contact reaction between the magnesium halide (A) and the alkoxide compound (B) with the organic hydroxy compound compound (C), and only the surfaces of the particles are treated with the organic hydroxy compound, the organic hydroxy compound not being allowed to permeate into the interior of the particles. The product thus obtained is a mass of particles, each particle of which is made up of spherules, that is the primary particles, that have come from the reaction product of (A) and (B) and are adhered to each other at their surfaces to form the particle.

Contacting of the so-obtained solid particles with the liquid titanium halide (D) [optionally together with the electron donor (G) and the polymeric silicon compound (E)] can be carried out in the same manner as described above with respect to the contacting between the compounds (A) and (B).

Polymerization of Olefins

Formation of catalyst

The catalyst component of the present invention can be combined with an organic metal compound as the co-catalyst and used for polymerization of olefins.

Any of known organic co-catalyst compounds of metals of Groups I through IV of the Periodic Table can be used, and organic aluminum compounds are especially preferred. Examples of the organic aluminum compound are compounds represented by the general formula $R_{3-n}^3 AlX_n$ or $R_{3-m}^4 Al(OR^5)_m$ wherein: $R^3$, and $R^4$ which may be the same or different, stand for a hydrogen atom or a hydrocarbon residue having 1 to 20 carbon atoms; $R^5$ stands for a hydrocarbon residue having 1 to 20 carbon atoms; X stands for a halogen atom; n is a number of $0 \leq n < 2$; and m is a number defined by $0 \leq m \leq 1$. Specific examples are (a) trialkyl aluminum compounds such as trimethyl aluminum, triethyl aluminum, tri-isobutylaluminum, trihexylaluminum, trioctylaluminum and tridecylaluminum, (b) alkyl aluminum halides such as diethyl aluminum monochloride, di-isobutyl aluminum monochloride, ethyl aluminum sesquichloride and ethyl aluminum dichloride, (c) dialkyl aluminum halides such as diethylaluminum halide and di-isobutyl aluminum halide, and (d) alkyl aluminum alkoxides such as diethyl aluminum ethoxide, diethyl aluminum butoxide, and diethyl aluminum phenoxide.

These organic aluminum compounds (a) through (c) can be used also in combination with other organic metal compounds, for example, alkyl aluminum alkoxides represented by the general formula $R_{3-a}^7 Al(OR^8)_a$ in which a is a number defined by $1 \leq a \leq 3$, and $R^7$ and $R^8$, which may be the same or different, stand for a hydrocarbon residue having 1 to 20 carbon atoms. For example, triethyl aluminum can be used in combination with diethyl aluminum ethoxide, diethyl aluminum monochloride can be used in combination with diethyl aluminum ethoxide, ethyl aluminum dichloride can be used in combination with ethyl aluminum diethoxide, and triethyl aluminum can be used in combination with diethyl aluminum ethoxide and diethyl aluminum chloride.

The amount used of the organic metal compound is not particularly critical, but it is preferable that the organic metal compound be used in such an amount that the weight ratio of the organic metal compound to the solid catalyst component of the present invention is in the range of from 0.5 to 1000.

In order to improve the stereoregularity of a polymer of an olefin having at least 3 carbon atoms, it is preferable that an electron donative compound such as an ether, an ester or an amine be added and caused to be present in the catalyst system. The amount of the electron-donative compound used for this purpose is 0.001 to 2 moles, preferably 0.01 to 1 mole, per mole of the organic aluminum compound.

Olefin

An olefin to be polymerized by using the catalyst system of the present invention is generally represented by the general formula $R-CH=CH_2$ in which R stands for a hydrogen atom or a hydrocarbon residue having 1 to 10 carbon atoms, which may be branched.

Specific examples of the olefin are ethylene, propylene, butene-1, pentene-1, hexene-1, and 4-methylpentene-1, ethylene and propylene being preferred. Ethylene can be copolymerized in a quantity of up to 50% by weight, preferably up to 20% by weight, with another olefin as mentioned above, and propylene can be copolymerized in a quantity of up to 30% by weight with another olefin as mentioned above, especially ethylene. Moreover, copolymerization with another copolymerizable monomer such as vinyl acetate or diolefin can be carried out.

Polymerization

Of course, the catalyst system of the present invention can be applied to ordinary slurry polymerization. Furthermore, the catalyst system of the present invention can be applied also to liquid-phase solvent-free polymerization and gas-phase polymerization in which a solvent is not substantially used. Moreover, the catalyst system of the present invention can be applied to continuous polymerization, batchwise polymerization and polymerization including preliminary polymerization. In the case of the slurry polymerization, saturated aliphatic aromatic hydrocarbons such as hexane, heptane, pentane, cyclohexane, benzene, toluene and mixtures thereof are used as the polymerization solvent. The polymerization temperature is in the range of from room temperature to about 200° C., preferably from 50° to 150° C. Hydrogen can be auxiliarily used as a molecular weight modifier.

Experimental Examples

The present invention will now be described in detail with reference to the following examples, which by no means are intended to limit the scope of the invention.

EXAMPLE 1

Preparation of Catalyst Component

A 1-liter flask, the inner atmosphere of which had been thoroughly substituted by nitrogen, was charged with 75 ml of amply degassed and purified n-heptane. 10 g of anhydrous $MgCl_2$ (A) (pulverized for 24 hours in a ball mill) and 10 ml of $Ti(O-n-C_4H_9)_4$ (B) were introduced into the flask, and reaction was carried out at 70° C. for 30 minutes. Then, a mixture of 5.4 ml of n-butanol (C) and 5.4 ml of n-heptane was introduced in the form of liquid drops of 210-micron size from a spray nozzle for 10 seconds, and reaction was carried out at 70° C. for 1 hour.

The particles thus obtained were agglomerates of fine particles before addition of butanol. Then, 2.3 ml of $TiCl_4$ (D) was introduced, and reaction was carried out at 70° C. for 1 hour. Thereafter, 9 ml of methylhydrodiene-polysiloxane (E) was introduced, and reaction was carried out at 70° C. for 2 hours. The solid component formed by the reaction was used as the catalyst component. A part of the solid component was sampled, and the Ti content in the catalyst component was measured and was found to be 10.5% by weight. When the average particle size of the catalyst component was measured according to the sedimentation method, it was found to be 16 microns.

Polymerization of Ethylene

Evacuation/ethylene substitution was repeated several times in a stainless steel autoclave having an inner capacity of 1.5 liters and equipped with an agitator and a temperature-controlling device, and 800 ml of amply dehydrated and deoxidated n-heptane was introduced into the autoclave. Then, 100 mg of triethyl aluminum and 5 mg of the catalyst component synthesized as described above were introduced. The temperature was elevated to 85° C., and hydrogen was introduced under a partial pressure of 4 kg/cm². Ethylene was introduced under a partial pressure of 5 kg/cm² so that the total pressure was 9 kg/cm²G. Polymerization was carried out for 3 hours. The above conditions were kept constant during the polymerization, but in order to compensate for the reduction of the pressure with progress of the polymerization, the above pressure was maintained by introduction of ethylene alone.

After completion of the polymerization, ethylene and hydrogen were purged, and the content was taken out from the autoclave. The polymer slurry thus obtained was filtered and dried overnight by a vacuum drier to obtain 216 g of a polymer. That is, the polymer (PE) was obtained in an amount of 43,200 g per gram of the solid catalyst component [the yield based on the catalyst was 43,200 (g.PE/g of the catalyst component)]. When the melt flow rate (MFR) of the polymer was measured, it was found to be 3.7 (g/10 minutes). The average particle size was 580 microns, and the bulk specific gravity was 0.34 (g/cc).

EXAMPLE 2

Preparation of Catalyst Component

A catalyst component was prepared in the manner described in Example 1 except that: 3.4 ml of ethanol (C) was used instead of n-butanol (C); the amount of TiCl$_4$ (D) used was changed to 25 ml; and methylhydrodiene-siloxane (E) was not used. The Ti content in the thus obtained catalyst component was 11.6% by weight, and the average particle size thereof was 21 microns.

Polymerization of Ethylene

Polymerization of ethylene was carried out under the same conditions as described in Example 1, whereby 156 g of the polymer was obtained [the yield of the polyethylene was 31,200 g per g of the catalyst component]. The average particle size of the polymer was 692 microns, and the bulk specific gravity of the polymer was 0.32 (g/cc).

EXAMPLE 3

Preparation of Catalyst Component

A catalyst component was prepared in the manner described in Example 1 except that Si(OC$_2$H$_5$)$_4$ (B) was used instead of Ti(O—n—C$_4$H$_9$)$_4$. The Ti content was 6.1% by weight, and the average particle size was 17 microns.

Polymerization of Ethylene

Polymerization of ethylene was carried out under the conditions described in Example 1 except that 200 mg of tri-isobutyl aluminum was used instead of triethyl aluminum.

By this polymerization, 96 g of a polymer was obtained (the yield was 19,200 g. PE/g of the catalyst component). The melt flow rate was 4.8 (g/10 minutes); the average particle size of the polymer was 481 microns; and the bulk specific gravity of the polymer was 0.32 (g/cc).

EXAMPLE 4

Copolymerization of Ethylene with Butene-1

Polymerization was carried out in the manner described in Example 1 except that an ethylene/butene-1 gaseous mixture containing 10% by volume of butene-1 was used instead of ethylene, and the polymerization temperature was changed to 65° C., whereby 203 g of a polymer was obtained (the yield was 40,600 g per g of the catalytic component). The melt flow rate was 3.7 (g/10 minutes); the average particle size of the polymer was 557 microns; the bulk specific gravity of the polymer was 0.33 (g/cc); and the density of the polymer was 0.933 (g/cc).

EXAMPLE 5

Gas-Phase Copolymerization of Ethylene with Butene-1

Into a gas-phase polymerization vessel disclosed in Example 1 of Japanese Patent Application Laid-Open Publication No. 57-73011, amply purified polyethylene powder was charged, and then, 100 mg of triethyl aluminum and 10 mg of the catalyst component synthesized in Example 1 were introduced into the polymerization vessel. Then, hydrogen was introduced under a partial pressure of 0.8 kg/cm². The temperature was elevated to 85° C., and introduction of an ethylene/butene-1 gaseous mixture containing 10% by volume of butene-1 was started. Polymerization was conducted under a total pressure of 9 kg/cm² at 85° C. for 2.5 hours, whereby 218 g of a polymer was obtained. The melt flow rate was 2.7 (g/10 minutes), and the density of the polymer was 0.927 (g/cm³).

EXAMPLE 6

Preparation of Catalyst Component

The steps up to the reaction with butanol (C) were conducted in the same manner as described in Example 1. The solid particles thus obtained were amply washed with n-heptane. 11.6 ml of SiCl$_4$ (F) was then introduced, and reaction was carried out at 70° C. for 1 hour. The reaction product was amply washed with n-heptane. Then, 12 ml of diheptyl phthalate (G) was introduced, and reaction was carried out at 70° C. The reaction product was amply washed with n-heptane. 50 ml of TiCl$_4$ (D) was then introduced, and reaction was carried out at 110° C. for 3 hours. The reaction product was amply washed with n-heptane to obtain a catalyst component. The Ti content was 3.57% by weight, and the average particle size of the catalyst component was 15.2 microns.

Polymerization of Propylene

A stainless steel autoclave having an inner capacity of 1.5 liters and equipped with an agitator and a temperature-controlling device was charged with 500 ml of amply dehydrated and deoxidated n-heptane, and 125 mg of triethyl aluminum, 26.8 mg of diphenyldimethoxysilane and 15 mg of the catalyst component synthesized as described above were charged. Then, 60 ml of hydrogen was introduced; the temperature and pressure were elevated; and polymerization of propylene was carried out at a polymerization temperature of 75° C. under a polymerization pressure of 5 kg/cm²G for 2 hours. The polymer slurry thus obtained was recovered by filtration, and the polymer was dried to obtain 136 g of a polymer. Separately, 1.3 g of the polymer was obtained from the filtrate. In the boiling heptane extraction test, the I.I. of the total product (referred to as "T-I.I." hereinafter) was 97.1% by weight. The melt flow rate was 5.9 (g/10 minutes); the bulk specific gravity of the polymer was 0.37 (g/cc); and the average particle size of the polymer was 396 microns.

Comparative Example 1

Preparation of Catalyst Component

A catalyst component was prepared in the manner described in Example 1 except that the amount of butanol (C) used was changed to 27.0 ml. After introduction of butanol, agglomeration was caused to form particles having a size of about 1 to about 2 cm, but synthesis of the catalyst component was conducted as it was. The weight average particle size of the thus obtained catalyst component was 8.3 microns. Agglomerates of small particles were not observed.

Polymerization of Ethylene

Polymerization of ethylene was carried out in the same manner as described in Example 1 to obtain 221 g of a polymer. The melt flow rate was 4.5 (g/10 minutes); the average particle size of the polymer was 291 microns; and the bulk specific gravity of the polymer was 0.34 (g/cc).

Comparative Example 2

Preparation of Catalyst Component

A catalyst component was prepared in the manner described in Example 1 except that introduction of butanol (C) in the flask was performed over a period of 30 minutes by using a Widmer spiral. The particles of the thus obtained catalyst component were uneven.

Polymerization of Ethylene

Polymerization of ethylene was carried out in the same manner as described in Example 1 to obtain 278 g of a polymer. The melt flow rate was 4.1 (g/10 minutes); the average particle size of the polymer was 274 microns; and the bulk specific gravity was 0.38 (g/cc).

EXAMPLE 7

Preparation of Catalyst Component

A 1-liter flask, the inner atmosphere of which was thoroughly substituted by nitrogen, was charged with 75 ml of amply degassed and purified n-heptane. 10 g of anhydrous $MgCl_2$ (A) (pulverized for 24 hours in a ball mill), 10 ml of $Ti(O-n-C_4H_9)_4$ (B) and 0.5 g of $AlCl_3$ (F) were introduced into the flask, and reaction was carried out at 70° C. for 30 minutes. Then, a mixture of 5.4 ml of n-butanol (C) and 5.4 ml of n-heptane was introduced in the form of liquid drops of a size of 140 microns from a spray nozzle for 5 seconds, and reaction was carried out at 70° C. for 1 hour. Thereafter, 2.3 ml of $TiCl_4$ (D) was introduced, and reaction was carried out at 70° C. for 1 hour. Then, 9 ml of methylhydrodiene-polysiloxane (E) was introduced, and reaction was carried out at 70° C. for 2 hours.

After completion of the reaction, the Ti content in the catalyst component was measured and was found to be 9.8% by weight. When the average particle size of the catalyst component was measured according to the sedimentation method, it was found to be 26.3 microns.

Polymerization of Ethylene

A stainless steel autoclave having an inner capacity of 1.5 liters and equipped with an agitator and a temperature-controlling device was subjected to evacuation-ethylene substitution repeatedly several times, and 800 ml of amply dehydrated and deoxidated n-heptane was charged into the autoclave. Then, 100 mg of triethyl aluminum and 5 mg of the catalyst component synthesized as described above were introduced into the autoclave.

The temperature was elevated to 85° C., and hydrogen was introduced into the autoclave under a partial pressure of 4 $kg/cm^2$. Then ethylene was introduced under a partial pressure of 5 $kg/cm^2$ so that the total pressure became 9 $kg/cm^2G$. Polymerization was carried out for 3 hours, during which the above conditions were kept constant. In order to compensate for reduction of the pressure with progress of the polymerization, the above pressure was maintained by introduction of ethylene alone.

After completion of the polymerization, ethylene and hydrogen were purged, and the content was taken out from the autoclave. This polymer slurry was filtered and dried overnight by a vacuum drier to obtain 232 g of a polymer. The yield of the polymer (PE) was 46,400 g per gram of the solid catalyst component [the yield based on the catalyst component was 46,400 g.PE/g of the catalyst component]. When the melt flow rate (MFR) of the polymer was measured, it was found to be 4.1 (g/10 minutes). The average particle size of the polymer was 941 microns, and the bulk specific gravity was 0.33 (g/cc).

EXAMPLE 8

Preparation of Catalyst Component

A catalyst component was prepared in the manner described in Example 7 except that: 3.4 ml of ethanol (C) was used instead of n-butanol (C); the amount of $TiCl_4$ (D) used was changed to 25 ml; and methylhydrodiene-siloxane (E) was not used. The Ti content was 9.7% by weight, and the particle size was 28 microns.

Polymerization of Ethylene

Polymerization of ethylene was carried out in the same manner as described in Example 7 to obtain 143 g of a polymer. The yield based on the catalyst component was 28,600 g.PE/g of the catalyst component. The average particle size of the polymer was 860 microns, and the bulk specific gravity of the polymer was 0.33 (g/cc).

EXAMPLE 9

Preparation of Catalyst Component

A catalyst component was prepared in the manner described in Example 7 except that $Si(OC_2H_5)_4$ (B) was used instead of $Ti(O-n-C_4H_9)_4$ (B), and 0.41 g of $TiCl_3$ (F) was used instead of $AlCl_3$ (F). The Ti content was 7.2% by weight, and the average particle size was 19.5 microns.

Polymerization of Ethylene

Polymerization of ethylene was carried out in the manner described in Example 7 except that 200 mg of tri-isobutyl aluminum was used instead of triethyl aluminum.

By this polymerization, 103 g of a polymer was obtained. The yield based on the catalyst component was 20,600 g.PE/g of the catalyst component. The melt flow rate was 5.3 (g/10 minutes); the average particle size of the polymer was 485 microns; and the bulk specific gravity was 0.32 (g/cc).

EXAMPLE 10

Preparation of Catalyst Component

A catalyst component was prepared in the manner described in Example 7 except that 0.88 mg of ZrCl$_4$ (F) was used instead of AlCl$_3$ (F). The Ti content was 10.6% by weight, and the average particle size was 23.6 microns.

Polymerization of Ethylene

Polymerization of ethylene was carried out under the same conditions as described in Example 7 to obtain 208 g of a polymer. The yield based on the catalyst component was 41,600 g.PE/g of the catalyst component. The melt flow rate was 4.3 (g/10 minutes), and the average particle size of the polymer was 831 microns.

EXAMPLE 11

Polymerization of Gaseous Mixture of Ethylene and Butene-1

Polymerization was carried out in the manner described in Example 7 except that an ethylene/butene-1 gaseous mixture containing 10% by volume of butene-1 was used instead of ethylene, and the polymerization temperature was changed to 65° C., whereby 227 g of a polymer was obtained. The yield based on the catalyst component was 45,400 g.PE/g of the catalyst component. The melt flow rate was 3.6 (g/10 minutes); the average particle size was 925 microns; the bulk specific gravity of the polymer was 0.32 (g/cc); and the density of the polymer was 0.934 (g/cc).

EXAMPLE 12

Gas-Phase Copolymerization of Ethylene with Hexene-1

In the same manner as described in Example 5, refined polyethylene was charged in the gas-phase polymerization vessel used in Example 5, and 100 mg of triethyl aluminum and 10 mg of the catalyst component prepared in Example 7 were charged into the polymerization vessel. Then, hydrogen was introduced under a partial pressure of 0.3 kg/cm$^2$, and 16 ml of hexene-1 was introduced. Ethylene was then introduced, and polymerization was initiated under a total pressure of 5 kg/cm$^2$. At intervals of 30 minutes after initiation of the polymerization, 16 ml of hexene-1 was introduced. The total amount of introduced hexene-1 was 80 ml, and the polymerization time was 2.5 hours. By this polymerization, 206 g of a polymer was obtained. The melt flow rate was 1.7 (g/10 minutes), and the density of the polymer was 0.921 (g/cm$^3$).

EXAMPLE 13

Preparation of Catalyst Component

The steps up to the reaction with butanol (C) were conducted in the same manner as described in Example 7, and the thus obtained solid particles were amply washed with n-heptane. Then, 23.2 ml of SiCl$_4$ (F) was introduced, and reaction was carried out at 90° C. for 2 hours. The reaction product was amply washed with n-heptane. Then, 10.9 ml of diethyl phthalate (G) was introduced, and reaction was carried out at 90° C. for 1 hour. The reaction product was amply washed with n-heptane. 50 ml of TiCl$_4$ (D) was introduced, and reaction was carried out at 110° C. for 3 hours. The reaction product was amply washed with n-heptane to obtain a catalyst component. The Ti content was 3.96% by weight, and the average particle size of the catalyst component was 18.9 microns.

Polymerization of Propylene

Polymerization of propylene was carried out in the manner described in Example 6 except that 26 mg of phenyltriethoxysilane was used instead of diphenyldimethoxysilane, whereby 131 g of a polymer was obtained. The T-I.I. value was 96.6% by weight; the melt flow rate was 4.8 (g/10 minutes); the bulk specific gravity of the polymer was 0.36 (g/cc); and the average particle size of the polymer was 446 microns.

What is claimed is:

1. A catalyst component for polymerization of olefins, which consists essentially of a reaction product obtained by contacting the surfaces of particles of a product of contact reaction between (A) a halide of magnesium and (B) an alkoxy group-containing compound of a metal selected from Groups I through IV of the Periodic Table with (C) an organic hydroxy compound selected from the group consisting of alkanols, silanols and phenols for one second to five minutes so that only the surfaces of particles are treated with the organic hydroxy compound whereby the particles which remain substantially as they are adhere to each other at their surfaces to form particles of a larger particle size, and contacting the resulting contact reaction product with (D) a liquid titanium halide, and which in the form of particles of an average particle size in the range of from 10 microns to 100 microns.

2. A catalyst component as set forth in claim 1, wherein: the halide of magnesium (A) is magnesium chloride; the alkoxy group-containing metal compound (B) is an alkoxy group-containing titanium compound; and the liquid titanium halide (D) is titanium tetrachloride.

3. A catalyst component as set forth in claim 1, which is obtained by adding (F) an inorganic metal halide to the halide of magnesium (A) and the alkoxy group-containing metal compound (B) to form a contact reaction product, contacting the surfaces of the contact reaction product thus obtained with the organic hydroxy compound (C) and contacting the resulting contact reaction product with the liquid titanium halide (D).

4. A catalyst component as set forth in claim 1, which is obtained by contacting the surfaces of particles of the product of contact reaction between the halide of magnesium (A) and the alkoxy group-containing metal compound (B) with the organic hydroxy compound (C) and contacting the resulting contact reaction product with the liquid titanium halide (D) and a polymeric silicon compound (E).

5. A catalyst composition as set forth in claim 1, wherein a treatment with an electron donor is carried out before or after the contact reaction with the organic hydroxy compound (C).

6. A process for the preparation of a catalyst component for polymerization of olefins, which comprises contacting (A) a powdery halide of magnesium with (B) an alkoxy group-containing compound of a metal selected from metals of Groups I through IV of the Periodic Table to form a particulate solid contact reaction product, adding (C) an organic hydroxy compound selected from the group consisting of alkanols, silanols and phenols, in the form of fine droplets to the particulate solid contact reaction product for one second to five minutes to that only the surface of the solid product is treated with the organic hydroxy compound whereby the particles which remain substantially as they are adhere to each other at their surfaces into particles of a larger particle size to carry out a contact treatment, and contacting the resulting contact reaction product with (D) a liquid titanium halide to obtain a catalyst component in particulate form of an average particle size of 10 to 100 microns.

7. A process according to claim 6, wherein: a treatment with (F) an inorganic metal halide is carried out simultaneously with or subsequently to the treatment of the powdery halide of magnesium (A) with the alkoxy group-containing metal compound (B) to form a contact reaction product; the organic hydroxy compound (C) is added in the form of fine droplets to the obtained contact reaction product to carry out the contact treatment; and the resulting contact reaction product is then contacted with the liquid titanium halide (D).

8. A process according to claim 6, wherein: the powdery halide of magnesium (A) is contacted with the alkoxy group-containing metal compound (B) to form a contact reaction product; the organic hydroxy compound (C) is added in the form of fine droplets to the contact reaction product thus obtained to carry out the contact treatment; and the resulting contact reaction product is contacted with the liquid titanium halide (D) and a polymeric silicon compound (E).

9. A process according to claim 6, wherein: a treatment with (F) an inorganic metal halide is carried out simultaneously with or subsequently to the contact treatment of the powdery halide of magnesium (A) with the alkoxy group-containing metal compound (B) to form a contact reaction product; the organic hydroxy compound (C) is added in the form of fine liquid drops to the contact reaction product thus obtained to carry out the contact treatment; and the resulting contact reaction product is contacted with the liquid titanium halide (D) and a polymeric silicon compound (E).

10. A process according to claim 6, wherein: the halide of magnesium (A) is magnesium chloride; the alkoxy group-containing metal compound is an alkoxy group-containing titanium compound; and the liquid titanium halide (D) is titanium tetrachloride.

11. A process according to claim 6, wherein the amounts added of the alkoxy group-containing metal compound (B), the organic hydroxy compound (C) and the liquid titanium halide (D) are such that: the molar ratio of the compound (B) to the halide of magnesium (A) is in the range of from $1 \times 10^{-3}$ to 50; the molar ratio of the compound (C) to the halide of magnesium (A) is in the range of from $1 \times 10^{-4}$ to 1; and the molar ratio of the compound (D) to the halide of magnesium (A) is in the range of from $1 \times 10^{-3}$ to 50.

12. A process according to claim 7, wherein the amounts added of the alkoxy group-containing metal compound (B), the inorganic metal halide (F), the organic hydroxy compound (C) and the liquid titanium halide (D) are such that: the molar ratio of the compound (B) to the halide of magnesium (A) is in the range of from $1 \times 10^{-3}$ to 50; the molar ratio of the compound (F) to the halide of magnesium (A) is in the range of from $1 \times 10^{-4}$ to 1.0; the molar ratio of the compound (C) to the halide of magnesium (A) is in the range of from $1 \times 10^{-4}$ to 1; and the molar ratio of the liquid titanium halide (D) to the magnesium halide is in the range of from $1 \times 10^{-3}$ to 50.

13. A process according to claim 8, wherein the amounts added of the alkoxy group-containing metal compound (B), the organic hydroxy compound (C), the liquid titanium halide (D) and the polymeric silicon compound (E) are such that: the molar ratio of the compound (B) to the halide of magnesium (A) is in the range of from $1 \times 10^{-3}$ to 50; the molar ratio of the compound (C) to the halide of magnesium (A) is in the range of from $1 \times 10^{-4}$ to 1; the molar ratio of the compound (D) to the halide of magnesium (A) is in the range of from $5 \times 10^{-2}$ to $4 \times 10^{-1}$; and the molar ratio of the compound (E) to the magnesium halide is in the range of from $1 \times 10^{-3}$ to 50.

14. A process according to claim 9, wherein the amounts added of the alkoxy group-containing metal compound (B), the inorganic metal halide (F), the organic hydroxy compound (C), the liquid titanium halide (D) and the polymeric silicon compound (E) are such that: the molar ratio of the compound (B) to the halide of magnesium (A) is in the range of from $1 \times 10^{-3}$ to 50; the molar ratio of the compound (F) to the halide of magnesium (A) is in the range of from $1 \times 10^{-4}$ to 1.0; the molar ratio of the compound (C) to the halide of magnesium (A) is in the range of from $1 \times 10^{-4}$ to 1; the molar ratio of the compound (D) to the halide of magnesium (A) is in the range of from $5 \times 10^{-2}$ to $4 \times 10^{-1}$; and the molar ratio of the compound (E) to the halide of magnesium (A) is in the range of from $1 \times 10^{-3}$ to 50.

15. A processing according to claim 6, wherein the organic hydroxy compound (C) is a liquid alkanol.

16. A process according to claim 14 wherein the organic hydroxy compound (C) is a liquid alkanol.

17. A catalyst component as set forth in claim 4, wherein the amounts added of the alkoxy group-containing metal compound (B), the inorganic metal halide (F), the organic hydroxy compound (C), the liquid titanium halide (D) and the polymeric silicon compound (E) are such that: the molar ratio of the compound (B) to the halide of magnesium (A) is in the range of from $1 \times 10^{-3}$ to 50; the molar ratio of the compound (F) to the halide of magnesium (A) is in the range of from $1 \times 10^{-4}$ to 1.0; the molar ratio of the compound (C) to the halide of magnesium (A) is in the range of from $1 \times 10^{-4}$ to 1; the molar ratio of the compound (D) to the halide of magnesium (A) is in the range of from $5 \times 10^{-2}$ to $4 \times 10^{-1}$; and the molar ratio of the compound (E) to the halide of magnesium (A) is in the range of from $1 \times 10^{-3}$ to 50.

18. The catalyst component as set forth in claim 17 wherein the organic hydroxy compound (C) is a liquid alkanol.

* * * * *